Jan. 17, 1961 I. W. SANDBERG 2,968,773

ACTIVE ONE-PORT NETWORK

Filed Dec. 17, 1959 2 Sheets-Sheet 1

$$Z(s) = \frac{s^2+s+1}{s^2+s+2}$$

INVENTOR
I. W. SANDBERG
BY Ralph P. Holcomb
ATTORNEY

Jan. 17, 1961 I. W. SANDBERG 2,968,773

ACTIVE ONE-PORT NETWORK

Filed Dec. 17, 1959 2 Sheets-Sheet 2

INVENTOR
I. W. SANDBERG
BY Ralph P. Holcomb
ATTORNEY

United States Patent Office 2,968,773

Patented Jan. 17, 1961

2,968,773

ACTIVE ONE-PORT NETWORK

Irwin W. Sandberg, Springfield, N.J., assignor to Bell Telephone Laboratories, Incorporated, New York, N.Y., a corporation of New York Filed Dec. 17, 1959, Ser. No. 860,258

9 Claims. (Cl. 333—80)

This invention relates to wave transmission networks and more particularly to active, one-port networks.

An object of the invention is to eliminate inductors in a one-port network without restricting its driving-point impedance. A further object is to reduce the number of component elements in such a network.

It is often desirable to avoid the use of inductors in wave transmission networks since resistors and capacitors are more nearly ideal elements and are generally cheaper, lighter, and smaller. This is especially true in control systems where exacting performance may be required at very low frequencies. Elimination of inductors requires the use of an active element, if the characteristics of the network are to retain their generality. The rapid development of the transistor has provided an efficient, low-cost, active element suitable for this purpose. Therefore, active networks are assuming considerably more importance.

The present invention provides a one-port (or two-terminal) network which has an unrestricted driving-point impedance Z but requires no inductors. The network comprises four resistance-capacitance (RC) impedance branches formed into a bridge and a two-port, three-terminal, active network connected to three corners of the bridge, the intermediate one of which may be grounded. The branches are equal in pairs, have impedances $Z_1$, $Z_1$, $Z_2$, and $Z_2$, and are alternately arranged in the bridge. The two-port network, with input open-circuited, has zero output admittance and unity reverse voltage transmission and, with output short-circuited, has zero input impedance and a current transfer function equal to $Z_3/Z_4$. The driving-point impedance, between the intermediate corner and the fourth corner of the bridge, is given by the expression $$Z=\frac{Z_4-Z_3}{\frac{Z_4}{Z_1}-\frac{Z_3}{Z_2}} \qquad (1)$$

The two-port network is an impedance converter which may be constructed with two RC impedance branches, two transistors, and means for supplying the required biasing voltages.

In some cases, an additional RC impedance branch is connected to the bridge circuit. This may be either a series branch comprising either a capacitor or the parallel combination of a resistor and a capacitor, or a shunt branch comprising a capacitor or a resistor and a capacitor in series. In other cases, each of the impedance branches $Z_1$ and $Z_2$ of the bridge may comprise only a resistor.

Figure 1:
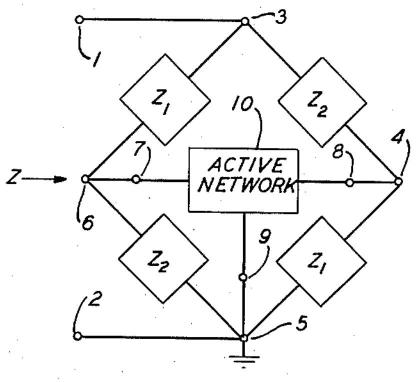
Figure 2:
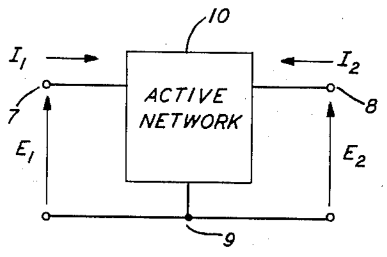
Figure 3:
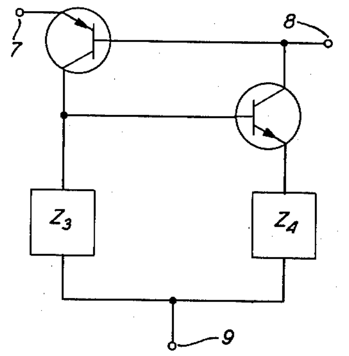
Figure 4:
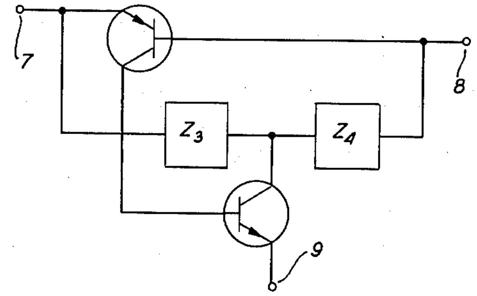
Figure 7:
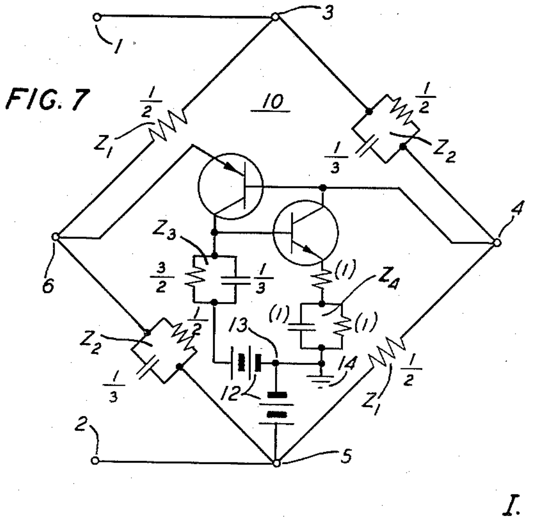
Figure 5:
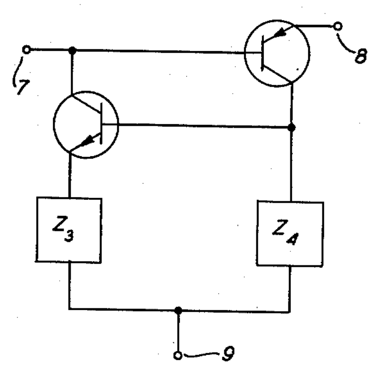
Figure 6:
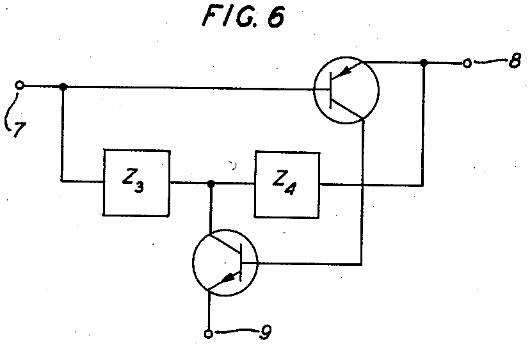
Figure 8:
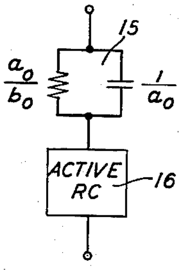
Figure 9:
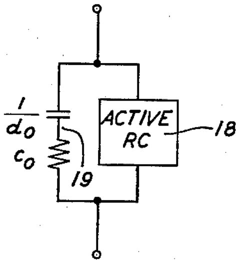

The nature of the invention and its various objects, features, and advantages will appear more fully in the following detailed description of the typical embodiments illustrated in the accompanying drawing, of which Fig. 1 is a block diagram of an active one-port network in accordance with the invention;

Fig. 2 is a diagram showing the voltages and currents associated with the component two-port network shown in Fig. 1;

Figs. 3, 4, 5, and 6 are diagrams of alternative circuits which may be used for the two-port network;

Fig. 7 is a schematic circuit of an embodiment of the one-port network of Fig. 1 using the active two-port network of Fig. 3, and Figs. 8 and 9 are diagrams of modifications of the network shown in Fig. 1 in which an additional RC impedance branch is connected, respectively, in series and in shunt.

The one-port, active network of Fig. 1 comprises a pair of branches each of impedance $Z_1$ and a pair of branches each of impedance $Z_2$ alternately connected to form a bridge with corners 3, 4, 5, and 6 at the junction points. The branches $Z_1$ and $Z_2$ comprise only resistors and capacitors or, in some cases, resistors alone. The network includes as a component an active, two-port network 10 with three terminals 7, 8, and 9 which are connected, respectively, to the corners 6, 4, and 5 of the bridge. The desired driving-point impedance Z is obtained at the terminals 1 and 2 which are connected, respectively, to the corners 3 and 5, the latter of which may be grounded, as shown.

Fig. 2 is a diagram of the two-port network 10 with input current $I_1$ and voltage $E_1$ and output current $I_2$ and voltage $E_2$ indicated. The arrows show the reference directions. Forward transmission is from left to right. The current and voltage relationships are as follows:

$$E_1=E_2 \qquad (2)$$

$$I_2=\frac{Z_3}{Z_4}I_1 \qquad (3)$$

where $Z_3/Z_4$ is the ratio of two RC driving-point impedances. Therefore, the network 10, with input terminals 7—9 open-circuited, has zero output admittance and unity reverse voltage transmission and, with output terminals 8—9 short-circuited, has zero input impedance and a current tranfer function equal to $Z_3/Z_4$.

Figs. 3, 4, 5, and 6 show diagrammatically four alternative converter circuits which may be used for the network 10. Each comprises two transistors and two branches comprising only resistors and capacitors and having impedances $Z_3$ and $Z_4$, respectively. The customary biasing voltages for the transistors have been omitted, to simplify the circuits. In these figures, the terminals 7, 8, and 9 correspond, respectively, with the like-numbered terminals in Figs. 1 and 2. These circuits are of the general type disclosed in the papers by Larkey and Yanagisawa in Transactions of the I.R.E., CT–4, September 1957, except that the branches $Z_3$ and $Z_4$ are, in general, complex instead of purely resistive.

It will now be explained how the network of Fig. 1 may be employed to provide any desired driving-point impedance Z without the use of inductors. It is assumed that Z is a function of $s$, where $s$ is a complex frequency variable. For real frequencies, $s$ becomes $j\omega$, where $\omega$ is the radian frequency variable. In the first case to be considered, $Z=Z(s)$ is positive on at least one section of the negative real axis of the complex frequency plane.

The driving-point impedance $Z(s)$ at the terminals 1—2 of the network of Fig. 1 is given by Equation 1 above. The impedance function which is to be synthesized is a real rational fraction in the complex frequency variable $s$, given by $$Z(s)=\frac{P(s)}{Q(s)} \qquad (4)$$

The synthesis consists of identifying each of the four parameters $Z_1$, $Z_2$, $Z_3$, and $Z_4$ with a two-terminal RC impedance function.

Assume that the prescribed function $Z(s)$ is positive on at least one section of the negative real axis of the complex frequency plane. Suppose we write $$Z(s)=\frac{\dfrac{P(s)}{\prod_{1}^{N}(s+\sigma_i)}}{\dfrac{Q(s)}{\prod_{1}^{N}(s+\sigma_i)}} \tag{5}$$

where $$0\leq\sigma_1<\sigma_2<\sigma_3\ldots<\sigma_N$$

and the number N is equal to the degree of the polynomial $P(s)$ or of the polynomial $Q(s)$, whichever is greater. The points $-\sigma_i$ are chosen to lie anywhere on the section or sections of the negative real axis where the function $Z(s)$ is finite and positive. The choice of the $\sigma_i$'s influences the spread of element values and the sensitivity of the driving-point impedance to variations in the active and passive elements.

We replace both the numerator and denominator of the right-hand side of (5) by their partial fraction expansions and group the resulting terms to obtain $$Z(s)=\frac{\dfrac{P_1}{Q_1}-\dfrac{P_2}{Q_2}}{\dfrac{P_3}{Q_1}-\dfrac{P_4}{Q_2}} \tag{6}$$

where $$Q_1Q_2=\prod_{1}^{N}(s+\sigma_i) \tag{7}$$

and $$\frac{P_1}{Q_1},\ \frac{P_2}{Q_2},\ \frac{P_3}{Q_1},\ \text{and}\ \frac{P_4}{Q_2}$$

are each RC driving-point impedances.

Equation 6 is equivalent to $$Z(s)=\frac{\dfrac{P_1}{Q_1}-\dfrac{P_2}{Q_2}}{\dfrac{P_3+RQ_1}{Q_1}-\dfrac{P_4+RQ_2}{Q_2}} \tag{8}$$

where R is a non-negative constant.

From Equation 8, we can identify the impedance parameters of Equation 1 as follows:

$$Z_1=\frac{P_1}{P_3+RQ_1} \tag{9}$$

$$Z_2=\frac{P_2}{P_4+RQ_2} \tag{10}$$

$$Z_3=\frac{P_2}{Q_2} \tag{11}$$

$$Z_4=\frac{P_1}{Q_1} \tag{12}$$

According to the qualifications appended to Equation 6, the functions $Z_3$ and $Z_4$ are RC driving-point impedances.

Consider the function $Z_1$. The degree of the polynomial $Q_1$ is at least as great as the degree of $P_3$. Note that as the parameter R assumes non-negative real values which increase from zero to infinity, the poles of $Z_1$ move the zeros of $P_3$ to the zeros of $Q_1$. Recall that the ratio of polynomials $$\frac{P_1}{Q_1}$$

is an RC driving-point impedance. Consequently, it is always possible to find a finite value of the parameter R for which the poles and zeros of $Z_1$ interlace properly.

A similar argument shows that $Z_2$ also can always be made an RC driving-point impedance. Note that $Z(s)$ need not be a positive-real function.

An example will now be presented of how to synthesize a biquadratic driving-point impedance given by $$Z(s)=\frac{s^2+s+1}{s^2+s+2} \tag{13}$$

This function is positive on the entire negative real axis. We choose $\sigma_1=1$, and $\sigma_2=2$. From Equations 6, 7, and 8, $$Z(s)=\frac{\dfrac{s+2}{s+1}-\dfrac{3}{s+2}}{\dfrac{s(1+R)+3+R}{s+1}-\dfrac{Rs+4+2R}{s+2}} \tag{14}$$

Employing Equations 9, 10, 11, and 12, $$Z_1=\frac{s+2}{s(1+R)+3+R} \tag{15}$$

$$Z_2=\frac{3}{Rs+4+2R} \tag{16}$$

$$Z_3=\frac{3}{s+2} \tag{17}$$

$$Z_4=1+\frac{1}{s+1} \tag{18}$$

The set of impedances is realizable for $R\geq1$. Choose $R=1$ so that $Z_1$ will be a pure resistance whose value from (15) in ohms is $$Z_1=\tfrac{1}{2} \tag{19}$$

From (16)

$$Z_2=\frac{3}{s+6} \tag{20}$$

which is given by a resistor of ½ ohm in parallel with a capacitor of ⅓ farad.

The impedance $Z_3$ may be provided by the parallel combination of a resistor of 3/2 ohms and a capacitor of ⅓ farad. The impedance $Z_4$ may be obtained from a one-ohm resistor in series with the parallel combination of a second one-ohm resistor and a one-farad capacitor. However, it is seen from Equation 1 and that $Z_3$ and $Z_4$ can be scaled by the same constant without affecting the impedance $Z(s)$. This degree of freedom may be utilized to optimize some figure of merit such as the sensitivity function. The choice of the $\sigma_i$'s is similarly influenced.

Fig. 7 shows the resulting network for the example presented above. The values of the resistors in ohms and the capacitors in farads are given alongside the elements. The values 1 are enclosed in parentheses to avoid confusing them with part designations. The desired driving-point impedance $Z(s)$ is obtained between the terminals 1 and 2. The active network 10 is of the type shown in Fig. 3. A source of biasing voltage 12 is provided between $Z_3$ and the corner 5, and $Z_4$ connects to a tapping point 13. The point 13 is grounded as shown at 14, thus effectively grounding the corner 5 for alternating-current signals.

The method of synthesis presented above is not applicable to functions which are non-positive on the entire negative real axis. This is a significant theoretical restriction since positive-real functions, for example, need not possess the required property. In particular, all purely reactive impedance functions must be excluded.

This difficulty can be circumvented in several ways by modifications of the synthesis technique. Suppose that the prescribed impedance $Z(s)$ is non-positive on the entire negative real axis. The function $$Z'(s)=Z(s)-\frac{a_0}{s+b_0} \tag{21}$$

where $a_0>0$ and $b_0\geq0$ must however be positive on one section of the negative real axis. It can therefore be synthesized by the previously discussed procedure. The impedance $Z(s)$ is obtained by connecting an RC impedance branch 15 in series with the resulting network 16 as shown in Fig. 8. The branch 15 comprises either a capacitor of $1/a_0$ farads or a resistor of $a_0/b_0$ ohms in parallel with a capacitor of $1/a_0$ farads.

An alternative procedure on an admittance basis also applies. As shown in Fig. 9, the modified network is made up of an active, one-port, RC network 18 shunted by an RC impedance branch 19. The impedance of the branch 19 is $c_0+d_0/s$, where $d_0>0$ and $c_0 \geqq 0$. The branch 19 consists of a capacitor of $1/d_0$ farads or a resistor of $c_0$ ohms in series with a capacitor of $1/d_0$ farads.

Both of the methods described above often necessitate a larger number of passive components than would be required for the synthesis of $-Z(s)$. For this reason, it may be more desirable to employ a negative-impedance converter terminated by an impedance branch having the value $-Z(s)$.

The network shown in Fig. 7 resulting from the synthesis of the biquadratic impedance function (13) requires a total of four capacitors. Two of these are in the bridge arms $Z_2$ and the other two in the branches $Z_3$ and $Z_4$ of the network 10. The capacitors in the arms $Z_2$ can be eliminated by employing an alternative procedure. The resulting structure has the advantage that the bridge requires only resistors.

We consider a more general problem, the synthesis of the biquadratic impedance function $$Z(s)=\frac{s^2+axs+by}{s^2+as+b}$$

$$a,\ b,\ y>0 \qquad (22)$$

where $Z(s)$ is assumed to have complex conjugate poles and a numerator which is non-negative on the negative real axis. The numerator may therefore have complex conjugate zeros, real zeros of multiple two, or distinct positive real zeros. The point $(x, y)$ is to lie anywhere in the upper half of the $xy$ plane. Our objective is to synthesize $Z(s)$ with only two capacitors.

The impedance parameters of (1) can be identified as follows:

$$Z_4=\sigma_2-\sigma_1+k(\sigma_2^2-ax\sigma_2+by)+\frac{\sigma_1^2-ax\sigma_1+by}{s+\sigma_1} \qquad (23)$$

$$Z_3=(\sigma_2^2-ax\sigma_2+by)\left(\frac{1}{s+\sigma_2}+k\right) \qquad (24)$$

$$\frac{Z_4}{Z_1}=\sigma_2-\sigma_1+k(\sigma_2^2-a\sigma_2+b)+\frac{\sigma_1^2-a\sigma_1+b}{s+\sigma_1} \qquad (25)$$

$$\frac{Z_3}{Z_2}=(\sigma_2^2-a\sigma_2+b)\left(\frac{1}{s+\sigma_2}+k\right) \qquad (26)$$

where $k$ is a non-negative real parameter and $\sigma_2>\sigma_1 \geqq 0$. The functions $Z_3$ and $Z_2$ are realizable where $$Z_2=R_2=\frac{\sigma_2^2-ax\sigma_2+by}{\sigma_2^2-a\sigma_2+b} \qquad (27)$$

The impedance $Z_1$ can be made a resistance $R_1$ given by $$R_1=\frac{\sigma_1^2-ax\sigma_1+by}{\sigma_1^2-a\sigma_1+b} \qquad (28)$$

providing $$a\sigma_1(1-x)(k\sigma_2+1)+b(y-1)[k(\sigma_1+\sigma_2)+1]+kab(x-y)=0 \qquad (29)$$

Equation 29 can always be satisfied by properly choosing $\sigma_1$, $\sigma_2$ and $k$.

An example will now be given of how to use this latter procdure to provide a driving-point impedance given by $$Z(s)=\frac{s^2-3s+2}{s^2+s+1} \qquad (30)$$

Using (29)

$$\sigma_2=\frac{5-\sigma_1}{1+4\sigma_1}-\frac{1}{k} \qquad (31)$$

For $\sigma_2>\sigma_1$ $$0\leq\sigma_1<\frac{1}{4}(\sqrt{21}-1) \qquad (32)$$

Choosing $\sigma_1=½$ and $k=2$ gives $\sigma_2=1$. From (23), (24), (25), and (26), $$Z_1=5 \qquad (33)$$

$$Z_2=6 \qquad (34)$$

$$Z_3=12+\frac{6}{s+1} \qquad (35)$$

$$Z_4=\frac{25}{2}+\frac{\frac{15}{4}}{s+\frac{1}{2}} \qquad (36)$$

$$a\sigma_1(1-x)(k\sigma_2+1)+b(y-1)[k(\sigma_1+\sigma_2)+1]+kab(x-y)=0 \qquad (29)$$

It is thus seen that, in this example, the bridge arm $Z_1$ is a five-ohm resistor and the arm $Z_2$ is a six-ohm resistor. Also, the impedance branches $Z_3$ and $Z_4$ will have the same configuration as that shown for $Z_4$ in Fig. 7.

It is to be understood that the above-described arrangements are only illustrative of the application of the principles of the invention. Numerous other arrangements may be devised by those skilled in the art without departing from the spirit and scope of the invention.

What is claimed is:

1. An active, one-port network comprising a pair of branches each of impedance $Z_1$, a pair of branches each of impedance $Z_2$, and an active, three-terminal, two-port network, the branches being alternately arranged to form a bridge having four corners at the respective junction points, the terminals of the two-port network being connected, respectively, to three corners of the bridge, the intermediate one of which may be grounded for alternating-current signals, the two-port network, with its input terminals open-circuited, having zero output admittance and unity reverse voltage transmission and, with its output terminals short-circuited, having zero input impedance and a current transfer function equal to the ratio of two impedances $Z_3$ and $Z_4$, the driving-point impedance between the intermediate corner and the diagonally opposite corner of the bridge being equal to $$\frac{Z_4-Z_3}{\frac{Z_4}{Z_1}-\frac{Z_3}{Z_2}}$$

and the impedances $Z_1$, $Z_2$, $Z_3$, and $Z_4$ requiring no inductors for their realization.

2. A network in accordance with claim 1 in which the branches $Z_1$ and $Z_2$ comprise only resistors.

3. A wave transmission network comprising two branches each of impedance $Z_1$, two branches each of impedance $Z_2$, and a two-port, active network with three terminals which may be designated 7, 8, and 9, the branches being alternately connected to form a closed loop the junction points of which may be consecutively designated 3, 4, 5, and 6 with a $Z_2$ branch between points 3 and 4, the forward direction of transmission through the two-port network being from terminals 7—9 to terminals 8—9, the terminal 7 being connected to point 6, terminal 8 to point 4, and terminal 9 to point 5, the two-port network, with terminals 7—9 open-circuited, having zero admittance at terminals 8—9 and unity voltage transmission from terminals 8—9 to terminals 7—9 and, with its terminals 8—9 short-circuited, having zero impedance at terminals 7—9 and a current transfer function equal to the ratio of $Z_3/Z_4$ of two impedances, the driving-point impedance at the points 3 and 5 being $$\frac{Z_4 - Z_3}{\frac{Z_4}{Z_1} - \frac{Z_3}{Z_2}}$$

and the impedances $Z_1$, $Z_2$, $Z_3$, and $Z_4$ requiring only resistors and capacitors for their realization.

4. A network in accordance with claim 3 in which the branches $Z_1$ and $Z_2$ comprise only resistors.

5. A two-terminal wave transmission network having an unrestricted driving-point impedance Z but requiring no inductors comprising two one-port networks connected together, the first of the one-port networks comprising a capacitor, the other of the one-port networks comprising four branches of impedance $Z_1$, $Z_2$, $Z_1$, and $Z_2$, respectively, arranged in the order given to form a bridge with four corners at the junction points, and a three-terminal, two-port, active network having its terminals connected, respectively, to three of the corners so chosen that a $Z_2$ impedance is across the input and a $Z_1$ impedance across the output of the two-port network, the two-port network, with its input terminals open-circuited, having zero output admittance and unity reverse voltage transmission and, with its output terminals short-circuited, having zero input impedance and a current transfer function equal to the ratio of two impedances $Z_3$ and $Z_4$, Z being available between the intermediate of the three chosen corners and the diagonally opposite corner and equal to $$\frac{Z_4 - Z_3}{\frac{Z_4}{Z_1} - \frac{Z_3}{Z_2}}$$

6. A network in accordance with claim 5 in which the two one-port networks are connected in series.

7. A network in accordance with claim 6 in which the first one-port network comprises a resistor connected in parallel with the capacitor.

8. A network in accordance with claim 5 in which the two one-port networks are connected in parallel.

9. A network in accordance with claim 8 in which the first one-port network comprises a resistor connected in series with the capacitor.

No references cited.